United States Patent
Iffergan (10) Patent No.: US 7,123,785 B2
(45) Date of Patent: Oct. 17, 2006

(54) OPTIC FIBER SECURITY FENCE SYSTEM

(76) Inventor: David Iffergan, 8018 Agora Cir., Sugarland, TX (US) 77477

( * ) Notice: Subject to any disclaimer, the term of this patent is extended or adjusted under 35 U.S.C. 154(b) by 4 days.

(21) Appl. No.: 10/965,191

(22) Filed: Oct. 15, 2004

(65) Prior Publication Data

US 2006/0083458 A1    Apr. 20, 2006

(51) Int. Cl.
*G02B 6/26* (2006.01)

(52) U.S. Cl. .................. 385/13; 385/12; 340/541; 340/551; 356/73.1; 356/540

(58) Field of Classification Search .......... 385/12–13; 340/541, 555; 356/73.1, 450
See application file for complete search history.

(56) References Cited

U.S. PATENT DOCUMENTS

| | | |
|---|---|---|
| 4,365,239 A | 12/1982 | Mongeon |
| 4,371,869 A | 2/1983 | Davidson |
| 4,399,430 A | 8/1983 | Kitchen |
| 4,450,434 A | 5/1984 | Nielsen et al. |
| 4,518,953 A | 5/1985 | Hunter et al. |
| 4,521,767 A | 6/1985 | Bridge |
| 4,558,308 A | 12/1985 | Ciordinik et al. |
| 4,586,030 A | 4/1986 | Klostermann |
| 4,676,485 A | 6/1987 | Ciordinik et al. |
| 4,680,573 A | 7/1987 | Ciordinik et al. |
| 4,777,476 A | 10/1988 | Dank |
| 4,829,286 A | 5/1989 | Zvi |
| 4,916,433 A | 4/1990 | ver Loren van Themaat |
| 5,015,842 A | 5/1991 | Fradenburgh et al. |
| 5,434,557 A | 7/1995 | Alizi |

(Continued)

FOREIGN PATENT DOCUMENTS

DE          361632          12/1987

(Continued)

OTHER PUBLICATIONS

WWW.MATIMOP.ORG, "D-Fence Electronic Fencing & Security Systems Ltd. Profile of R&D," www.matimop.org (Tel Aviv, Israel), p. 2, (Nov. 21, 2003).

*Primary Examiner*—Sung Pak
*Assistant Examiner*—James D. Stein
(74) *Attorney, Agent, or Firm*—Pillsbury Winthrop Shaw Pittman LLP (57) ABSTRACT

A security system is described that includes an optical fiber net woven from an optical fiber wire. A light generator introduces an incident light signal into the optical fiber wire. A light receiver receives an exigent light signal from the optical fiber wire. An optical sensor wire is connected to the optical fiber net and is displaced when a force is applied to the optical fiber net. The optical sensor wire receives a patterned incident light signal that is altered upon application of the force applied to the optical fiber net, thereby producing an altered patterned exigent light signal. The light receiver initiates an alarm either (1) if the exigent light signal from the optical fiber wire terminates, or (2) after comparing the exigent patterned light signal with the incident patterned light signal in the optical sensor wire and establishing a deviation, if the deviation exceeds a predetermined threshold.

19 Claims, 7 Drawing Sheets

U.S. PATENT DOCUMENTS

| | | |
|---|---|---|
| 5,530,430 A | 6/1996 | Pavlov |
| 5,592,149 A * | 1/1997 | Alizi .......................... 340/550 |
| 6,400,268 B1 | 6/2002 | Lindskog |
| 6,583,721 B1 | 6/2003 | Dank et al. |
| 6,967,584 B1 * | 11/2005 | Maki .......................... 340/657 |
| 6,980,108 B1 * | 12/2005 | Gebbia et al. .............. 340/555 |
| 2002/0053977 A1 | 5/2002 | Perry |
| 2003/0052254 A1 | 3/2003 | Kudo et al. |
| 2003/0058105 A1 | 3/2003 | Wuestefeld et al. |
| 2003/0141975 A1 | 7/2003 | Hama et al. |
| 2005/0107968 A1 * | 5/2005 | Chun .......................... 702/69 |
| 2005/0254767 A1 * | 11/2005 | Chun .......................... 385/136 |

FOREIGN PATENT DOCUMENTS

| | | |
|---|---|---|
| EP | 0599267 | 6/1994 |
| GB | 2038060 A | 7/1980 |
| GB | 2062321 A | 5/1981 |
| JP | 3053400 | 3/1991 |

* cited by examiner

OPTIC FIBER SECURITY FENCE SYSTEM

FIELD OF THE INVENTION

Very broadly, the present invention concerns the construction of a physical security barrier, such as a fence, that incorporates optic fibers into its construction. More specifically, the present invention relies on optic fiber sensitivity to detect a security breach or an attempted security breach of the physical security barrier.

BACKGROUND OF THE INVENTION

There are numerous examples of physical security fences known in the prior art. In addition, the prior art is replete with examples of physical security fences that incorporate optic fibers thereinto, at least in part, to detect breaches of the physical fence by sounding an alarm when optical fibers are severed. Several examples are discussed below.

U.S. Pat. No. 4,365,239 describes an intrusion warning system for protecting a wall or a fence, in particular a chain link fence, against intrusion (via cutting) or by climbing over same. The system combines a shielded cable 2 with a chain link fence 1. The fence 1 is intended to extend around the perimeter of an area to be protected. The length of the shielded cable 2 may be as long as 1,000 feet (304.8 m) in the described example. The shielded cable 2 is an electrical coaxial cable with an inner conductor surrounded by an outer, shielded conductor with a layer of insulating dielectric material therebetween. In operation, a signal is sent through the coaxial cable. An attempt to break through the fence disrupts the electrical signal, triggering an alarm.

U.S. Pat. No. 4,399,430 describes an intruder detection security system including a security fence 2 made from a plurality of elongated members 4, 6, 8, 10, 12, 14. The elongated members are optical fibers surrounded by or coated with polyvinyl chloride ("PVC"). FIG. 9 of the '430 patent illustrates the cross-section of one of the elongated members, showing the optical fiber 1 loosely housed within a PVC tube 5 reinforced with Kevlar® strength members 3. (Kevlar® is a trademark of the Dupont Company referring to a para-aramid fiber manufactured by that company. According to the information provided by the DuPont Company through its website, http://www.dupont.com/kevlar/whatiskevlar.html, Kevlar® fibers consist of long molecular chains produced from poly-paraphenylene terephthalamide.) The elongated members 4, 6, 8, 10, 12, 14 form a mesh between two upright posts 16, 18. In one embodiment, at each joining point 20 of the elongated members 8, 10, 12, 14, the elongated members 8, 10, 12, 14 are joined together by a steel ferrule 36. The optical fibers 4, 6, 8, 10, 12, 14 are connected between an output control box 22 and an input control box 24. If the amplitude of the signals received by the output control box 22 fall outside a predetermined range, an output signal is transmitted to operate an alarm 34.

U.S. Pat. No. 4,371,869 describes a fence or wall incorporating a fiber-optic wave guide. The security system described in the '869 patent includes a composite strip 1 of bendable material, which is referred to as a carrier strip 2. The carrier strip 2 may be made of steel, for example. A single fiber-optic filament 3 extends within a groove running along the face of the carrier strip 2. The carrier strip 2 preferably is coated with a corrosion-resistant layer in the form of a sheathing 4, for example. A light source or laser generator 6 directs light into one end of the fiber-optic filament 3 and a detector 7 receives the light signal at the other end. The detector 7 is connected to a warning device 8. The warning device 8 is activated if a change in the intensity of light exiting the fiber-optic filament 3 falls outside of a predetermined range.

U.S. Pat. No. 4,450,434 describes an apparatus for determining a break in locations in fencing. As described, a cable 4 is strung along a fence 2 and is attached to the fence 2 via support means 6 (or is attached to the fence by being interwoven therein). The cable 4 is made of an optical fiber with an electrical transmission line running therealong. In the embodiment illustrated in FIG. 2, the cable 4 is made of two optical fibers 8, 10, which are coated with metallized coatings 12, 14. The coated fibers are separated from one another by the insulating material 16 in which they are embedded. The cable 4 is connected to an LED or laser transmitter 30 at one end and a light receiver 32 at the other end. One end of the transmission line is connected to a pulse generator 34 and a pulse receiver 36. The other end is open-circuited. The optical portion of the cable 4 carries the light signal such that a break in the light signal is detected by the level detector 40, triggering operation of an alarm means 42. The output of the level detector 40 is connected to the input of the electrical pulse generator 34, which generates an electrical pulse that is reflected to the pulse receiver 36. The time delay between the initiation and receipt of the electrical pulse permits the system to establish the location of the break.

U.S. Pat. No. 4,558,308 describes an intrusion warning wire-lattice that comprises a number of single fence sections 1 mounted between box-type posts 2. Each fence section 1 includes solid wires (shown in dashed lines) and a serpentine coil 4 made of a hollow wire (shown in solid lines). The tubular wires encapsulate an electrical or optical conductor 8 that is connected to a alarm system, which is responsive to a break or deformation of the electrical or optical conductor 8.

U.S. Pat. No. 4,829,286 describes a security fence system made up of a taut wire fence made of taut wires 10 strung in a parallel orientation between an anchoring post 12 and a sensor post 14. An optical fiber 17 is threaded serially through a plurality of adjacent sensor posts and is coupled to a signal transceiver 18. A taut wire connection element 34 is connected to the sensor post 14 and to two adjacent taut wires 36. The connection element 34 rotatably connects to the sensor post 14. An optical fiber engagement member 38 connects to the rod 30 so that is also rotates on the sensor post 14. The taut wire connection element 34 and the optical fiber engagement member 38 are connected to one another such that, if the taut wire connection element 34 and the optical fiber engagement member 38 rotate with respect to one another over a long period of time, the optical fiber 42 is not disturbed. As a result, no alarm sounds. However, if the taut wire connection element 34 is rotated rapidly, the optical fiber engagement member 38 also rotates, displacing the optical fiber 42, thereby triggering an alarm.

U.S. Pat. No. 5,530,430 describes a vibration responsive barbed tape security system. The security system is made up of multiple sections of fence barrier 1 that surround an area. The barrier includes a chain link fence 2 and a secondary barrier 4 in the form of a spiral barbed tape. A tube 24 is in contact with each loop of the spiral barbed tape. The tube 24 contains a vibration sensitive fiber optic cable 30 that transmits light in a predictable manner. Any movement or vibration of the tube vibrates the fiber optic cable, triggering an alarm.

UK Patent Application No. GB 2 038 060 describes an intruder alarm that gives an alarm when an intrusion has occurred into a protected area and also gives an alarm when an attempt to breach a protected area is in progress. The intruder alarm includes a network of optical fiber light conductors forming or included in a fence. Light is fed into the ones of the light conductors such that penetration or attempted penetration of the light conductors triggers an alarm.

According to the English translation, Japanese Patent No. JP 3053400 describes a trespasser monitor method that detects whether a trespasser exists and the position of the trespasser by detecting the position of the reflection of an optical pulse from a disconnection point.

Prior art security systems that rely at least in part on optical fiber technology have not been widely accepted because of certain disadvantages inherent in those systems. In particular, many prior art systems are prone to produce an unacceptably high error rate in detecting incursions into a protected perimeter. Specifically, prior art systems typically signal alarms even though a breach of the secure perimeter has not occurred. In addition, prior art systems typically are very expensive. This is due, at least in part, to the number or type of optical generator or receivers that are needed for the systems to operate.

These difficulties with the prior art, among others, cry out for a solution that the present invention provides.

SUMMARY OF THE INVENTION

The present invention resolves the difficulties with the prior art enumerated above.

In one aspect, the present invention combines an optic fiber net and an optical sensor wire to construct a security system capable of detecting a breach therethrough.

In another aspect, the present invention provides a security system that detects an attempted breach of the secure perimeter by detecting an attempted climb over or crawl under the optic fiber net.

Another aspect of the present invention provides for the construction of an inexpensive security fence that incorporates an optical detection system to detect an intrusion or attempted intrusion into an area protected by the system.

Accordingly, it is one aspect of the present invention to provide a security system that includes an optical fiber net woven from at least one optical fiber wire. A light generator is connected at a first end of the optical fiber net to introduce an incident light signal into the optical fiber wire. A light receiver is connected at a second end of the optical fiber net to receive an exigent light signal from the optical fiber wire. An optical sensor wire is connected to the optical fiber net such that the optical sensor wire is displaced when a force is applied to the optical fiber net. The optical sensor wire is connected between the light generator and the light receiver. Moreover, the one optical sensor wire receives a patterned incident light signal that is altered upon application of the force applied to the optical fiber net, thereby producing a patterned exigent light signal. The light receiver initiates an alarm either (1) if the exigent light signal from the optical fiber wire terminates, or (2) after comparing the patterned exigent light signal with the patterned incident light signal in the optical sensor wire and establishing a deviation, if the deviation exceeds a predetermined threshold.

It is still another aspect of the present invention to provide a security system where the light generator includes two light sources, one producing an incident light signal for the optical fiber net, the other producing a patterned incident light signal for the optical sensor wire.

Another aspect of the present invention is to provide a security system where the light receiver includes two light sensors, one receiving the exigent light signal from the optical fiber wire, the other receiving the patterned exigent light signal from the optical sensor wire.

One further aspect of the present invention provides for a security system that also includes a physical security barrier to which at least the optical fiber net is attached.

With regard to that aspect of the invention, the physical security barrier may be a chain link fence, a barbed wire fence, a weld mesh fence, a concrete wall palisade, a stone wall palisade, a hedge, or a brick wall palisade, to name but a few examples of the physical security barriers contemplated to be encompassed by the scope of the present invention.

An additional aspect of the present invention provides for a security system that includes a physical barrier in which a least the optical fiber net is embedded.

With regard to this aspect of the invention, the physical security barrier may be a chain link fence, a barbed wire fence, a weld mesh fence, a concrete wall palisade, a stone wall palisade, a hedge, or a brick wall palisade, to name but a few examples of the physical security barriers contemplated to be encompassed by the scope of the present invention.

A further aspect of the present invention provides for a security system where the light receiver includes a processor such as a computer, laptop, personal data assistant (PDA) or any type of processor available for a particular installation.

Another aspect of the present invention provides for a security system that includes a computer and a communications link. The communications link permits the computer to communicate with the light generator and/or the light receiver. The computer processes signals generated by the light receiver before initiating an alarm.

One more aspect of the present invention provides for a security system wherein the communications link comprises a wired connection.

One alternative aspect of the present invention provides for a security system where the communications link is a wireless connection.

A further aspect of the present invention provides for a security system that includes a physical security barrier. An optical fiber net is woven from an optical fiber wire disposed adjacent to the physical security barrier. A first light generator is connected at a first end of the optical fiber net to introduce an incident light signal into the optical fiber wire. A first light receiver is connected at a second end of the optical fiber net to receive an exigent light signal from the optical fiber wire. An optical sensor wire is connected to the optical fiber net such that the optical sensor wire is displaced when a force is applied to the optical fiber net. A second light generator is connected at a first end of the optical sensor wire to introduce a patterned incident light signal into the optical sensor wire. A second light receiver is connected at a second end of the optical sensor wire to receive a patterned exigent light signal from the optical sensor wire. The patterned incident light signal is altered upon application of the force applied to the optical fiber net, thereby producing a patterned exigent light signal. The light receiver initiates an alarm either (1) if the exigent light signal from the optical fiber wire terminates, or (2) after comparing the patterned exigent light signal with the patterned incident light signal in the optical sensor wire and establishing a deviation, if the deviation exceeds a predetermined threshold.

Further aspects of the invention will become apparent from the discussion that follows.

DESCRIPTION OF THE DRAWINGS

The drawings appended hereto are intended to assist in the discussion of the invention and are not intended to be limiting of the invention. Where appropriate, like reference numerals refer to like structures and components, in which.

DESCRIPTION OF THE EMBODIMENT(S) OF THE INVENTION

The security system 10 of the present invention is intended for use in a variety of applications. For example, the security system 10 may be used in combination with a chain link fence, a barbed wire fence, a weld mesh fence, a concrete wall palisade, a stone wall palisade, a hedge, a brick wall palisade, or any other freestanding physical barrier into which the security system 10 may be incorporated, onto which the security system 10 may be attached, or adjacent to which the security system 10 may be deployed. Alternatively, the security system 10 of the present invention may be erected around the perimeter of a secured area without being associated with a separate physical barrier. While specific embodiments of the invention will be described herein, the embodiments are meant to be illustrative only and are not meant to be limiting of the scope of the invention.

While the preferred embodiments of the present invention are directed to the combination of the security system 10 together with a man-made physical barrier, the invention is not limited solely to such embodiments. As indicated above, the security system 10 may be used in combination with a living physical barrier such as a hedge, for example. As would be appreciated by those skilled in the art, other living physical barriers may be substituted for a hedge without departing from the scope of the invention.

The security system 10 of the present invention is intended for application in a wide variety of specific installations. In particular, the security system 10 may be used to secure the perimeters of petrochemical plants, natural gas facilities, oil refineries, prisons, water districts and reservoirs, power plants, law enforcement facilities, airports, military bases, government buildings and installations, private buildings and installations, borders of localities, states, provinces, and countries, and any other sensitive perimeters.

The above listing of specific installations for the security system 10 is not intended to be exhaustive nor is it intended to limit the scope of the present invention. To the contrary, the wide variety of specific installations listed is intended to exemplify the enormous variety of specific installations where the security system 10 may be employed.

Concerning the deployment of the security system 10, it cannot be emphasized enough that the scope of uses contemplated is significantly expansive. Listed above are a few of the physical barriers with which the security system 10 may be used. Those skilled in the art would readily recognize that the list is not comprehensive of every possible example but is intended to suggest but a few possible variations. For example, a plaster wall could be the physical barrier in which (or on which) the security system 10 is embedded (or to which it attached). One contemplated use might be to secure a room within a house or a building where temporary security (e.g., for a period of a few days or weeks) is required.

On a related note, while the security system 10 is intended for use in permanent or semi-permanent security installations, it is contemplated that the security system 10 may be used to secure, for a limited time period, a defined perimeter. For example, in a situation where military personnel are deployed in a hostile environment, the security system 10 may be employed as a mobile perimeter. Since the security system 10 employs light-weight optic fiber technology, the security system 10 easily may be disassembled so that it may be moved and erected at a subsequent location.

Figure 1:
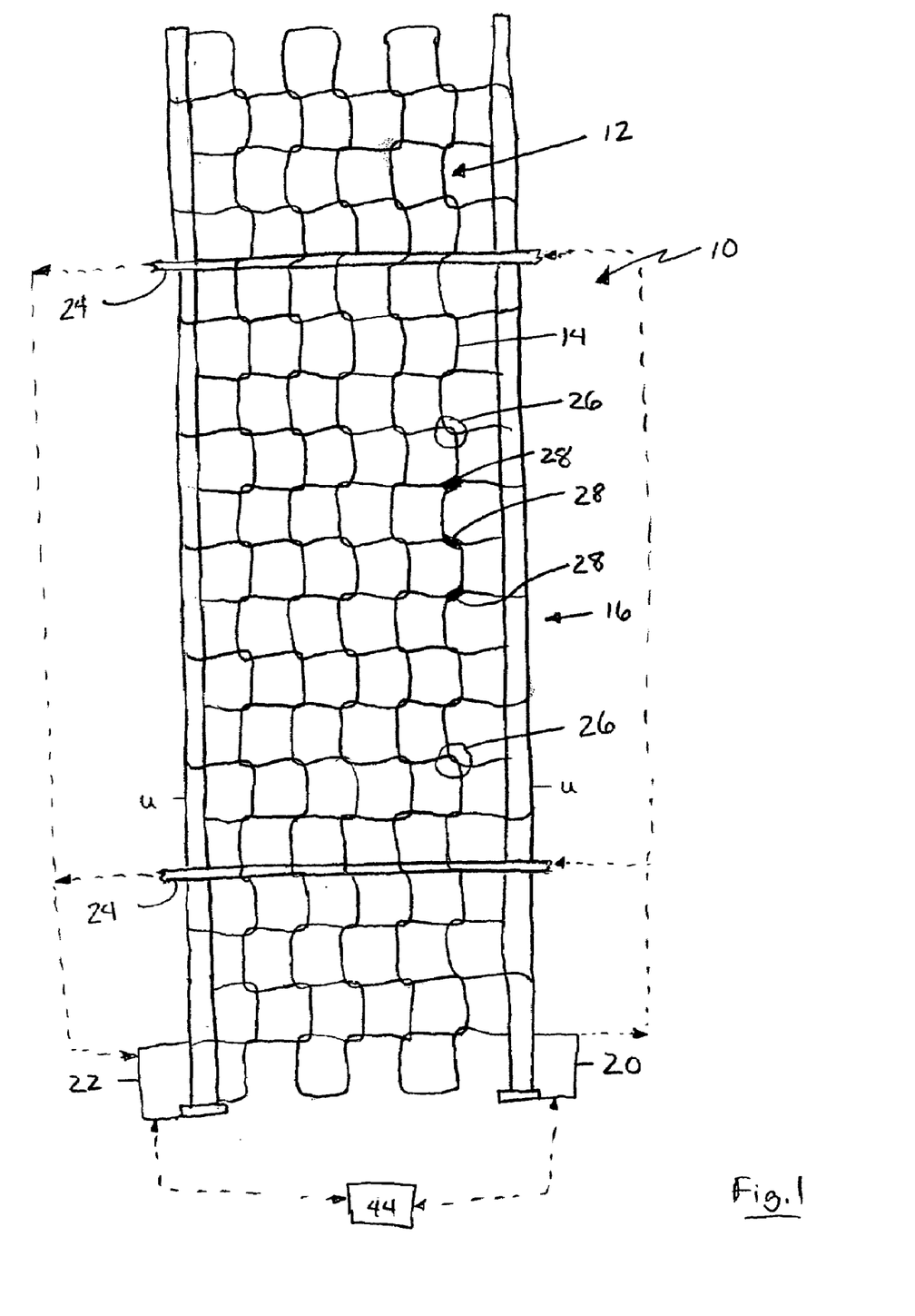
FIG. 1 is a front plan view of one embodiment of the optic fiber net portion of the present invention.

As illustrated in FIG. 1, the security system 10 of the present invention includes an optic fiber net 12. A single optic fiber wire 14 is woven in a pattern such that the single optic fiber wire 14 forms the fiber optic net 12. In other words, the optic fiber net 12 contains only one, continuous optic fiber wire 14. This is not to say that the continuous optic fiber wire 14 may not be made up of several individual optic fiber wires 14 connected end to end via a suitable connection, as would be appreciated by those skilled in the art.

In addition, while the preferred embodiments of the security system 10 incorporate an optic fiber net 12 with a single optic fiber wire 14, it is contemplated that the security system 10 may include an optic fiber net 12 with multiple (i.e., two or more) optic fiber wires 14 stranded together. Such a construction offers advantages that the single optic fiber wire 14 does not. For example, the optic fiber net 12 may be made stronger when two or more optic fiber wires 14 are stranded together. Alternatively, with the stranded approach, if one optic fiber wire 14 breaks, the security system 10 may be switched (manually or automatically) to the remaining optic fiber wires 14 without the immediate need to replace or repair the damaged optic fiber wire 14. Moreover, additional optic fiber wires 14 may be relied upon to provide redundancy in the security system 10. If one of the optic fiber wires 14 breaks, the security system may automatically switch its operation to rely on one or more of the optic fiber wires 14 to determine if there is a breach of more than one optic fiber wire 14, which may increase the accuracy of the security system 10 and reduce the occurrence of false alarms. In addition, the security system 10 may be designed to cycle periodically between the multiple optic fiber wires 14 for added security. Other advantages of the stranded approach will be apparent to those skilled in the art.

Since the optic fiber net 12 contains only a single, continuous optic fiber wire 14 in the preferred embodiment, the optic fiber net 12 is constructed to form a continuous, unbroken fabric. Alternatively, the optic fiber wire 14 may be woven into a plurality of individual panels 16 that may be connected (preferably optically) to one another to form a continuous fiber optic screen around the perimeter of the area to be protected.

In the preferred embodiment, the optic fiber net 12 comprises a plurality of individual panels 16 connected optically to one another in series. Alternatively, the security system 10 of the present invention may comprise a plurality of individual panels 16 that are operated independently of one another. In other words, the individual panels 16 need not be serially connected to one another for operation of the security system 10 of the present invention. In fact, in one preferred embodiment, individual panels 16 are not optically connected in series to one another, but are operated independently of one another. In another embodiment, the individual panels are operated in combination with one another. For example, two or more panels 16 are optically connected and each group of two or more panels 16 are operated independently of one another.

Manufacturing the optic fiber net 12 from a series of individual panels 16 offers at least one advantage over a construction where the optic fiber net 12 is a single, continuous fabric. In particular, if individual panels 16 are used, should one of the panels 16 become damaged or broken as the result of an intrusion (or a natural event), the damaged panel 16 may be easily removed so that a replacement panel 16 may be integrated into the security system 10. Other advantages of this construction will be apparent to those skilled in the art.

For purposes of the discussion herein, the term "panel" (as used with panel 16) should not be construed to be a panel 16 with any specific height or width dimensions. It is contemplated, for example, that the panel 16 may be eight feet (2.44 m) fall and four feet (1.22 m) wide. Alternatively, the panel may be twelve feet (3.66 m) tall and seven hundred fifty feet (228.6 m) wide. In still another embodiment, such as a marine environment, the panel 16 may be five hundred feet (153.4 m) tall and eighteen feet (5.49 m) wide. As the foregoing examples illustrate, the panel 16 need not be limited to any particular height or width. Each installation will have requirements that help to define the dimensional parameters associated with one panel 16. Furthermore, as would be appreciated by those skilled in the art, a particular security system 10 may incorporate panels 16 that differ in size and shape from one another around the perimeter to be secured and are connected to one another in a patchwork fashion.

The optic fiber net 12 may be constructed to have any suitable dimensions adequate to be erected as a security barrier. As would be appreciated by those skilled in the art, each security installation will present different dimensional challenges. The construction of the security system 10 is intended to be adaptable to the various types and sizes of installations that may be encountered. Moreover, the construction of the security system 10 is intended to be flexible so that it may be adapted to a variety of terrains and topographies. In particular, since the optic fiber net 12 is flexible, it may be installed easily over uneven ground or terrain or around an irregularly-shaped perimeter.

It is noted that the illustration of the security system 10 of the present invention in FIG. 1 may be employed in a variety of different environments. Specifically, while it is contemplated that, in the preferred embodiment, that the security system 10 will be utilized in an above ground arrangement, the invention is not limited solely to just an above-ground use. It is contemplated that the security system 10 may be employed wholly in a subterranean environment. Alternatively, the security system 10 of the present invention may be installed in a partially above ground and partially buried configuration, which discourages intrusions by digging under the security system 10. Alternatively still, the security system 10 of the present invention may be employed in a marine environment (fresh or salt water), where a portion of a body of water, such as a harbor, is to be secured. In a marine environment, the fiber optic net 12 may be suspended from a series of buoys that encircle the protected perimeter. Other constructions for a marine environment will be apparent to those skilled in the art, and a buoy construction is not intended to limit this particular embodiment.

It is noted that these environments are meant to be exemplary only and are not intended to limit the applicability of the security system 10 to any particular environment. As would be appreciated by those skilled in the art, and as indicated above, the security system 10 of the present invention finds wide applicability to a large variety of environments too numerous to list here.

One advantage to the security system 10 of the present invention lies in the fact that the security system 10, in one embodiment, relies on optic fiber technology to detect a breach in security or an attempted breach in security. As such, the security system 10 is immune to electromagnetic interference. Moreover, the security system 10 is immune to radio frequencies, electrostatic fields, and radiation, among other types of interference(s) that may be considered to diminish the security system's ability to function in its intended manner. One additional advantage of the security system 10 lies in the fact that the system 10 is transparent to radar microwaves. As such, if installed at an airport, the system 10 should not interfere with communications, avionics, or the operation of the air traffic control system.

As will be made apparent by the discussion that follows, the security system 10 of the invention is designed to be activated in response to a physical force or pressure exerted thereupon, even if momentary. However, the security system 10 is intended to withstand a long-term installation and is intended to be impervious to environmental factors and certain kinds of energies.

In one example, the security system 10 may be erected around the perimeter of an airport. Since the security system 10 relies on fiber optic technology to detect intrusions or attempted intrusions, the security system 10 cannot be affected by electromagnetic surges (such as lightening) in the vicinity thereof. Moreover, the security system 10 is "invisible" to radar, meaning that it does not generate reflective radar signals to the receivers at the airport. In some installations, this may be of benefit to air traffic controllers.

Radar invisibility may offer advantages in military or other high security installations. Other advantages will be appreciated by those skilled in the art and are, therefore, not recited here.

In the preferred embodiment of the invention, the optic fiber wire 14 comprises a single optic fiber that is clad in a suitable protective coating. The protective coating may be one or more layers of polyvinyl chloride and/or other materials, including aramid fibers such as Kevlar®, that provide adequate strength for the optic fiber wire 14. The construction of the optic fiber wire 14 should permit the wire 14 to flex. Among other advantages, it is believed that flexibility of the optic fiber wire 14 will extend the operational lifetime of the security system 10, since it is expected that the optic fiber wire 14 will be subjected to repetitive, minor stresses and strains, such as from wind or water currents, during its operational lifetime.

While, in the preferred embodiment, the coating should not be so rigid that the optic fiber wire 14 cannot flex when subjected to external forces, it is contemplated, in the alternative, that there may be instances where a rigid fiber optic net 12 is desired. If the fiber optic net 12 is made rigid, the fiber optic net 12 may be free-standing, which offers different advantages to consumers, as would be appreciated by those skilled in the art.

Figure 2:
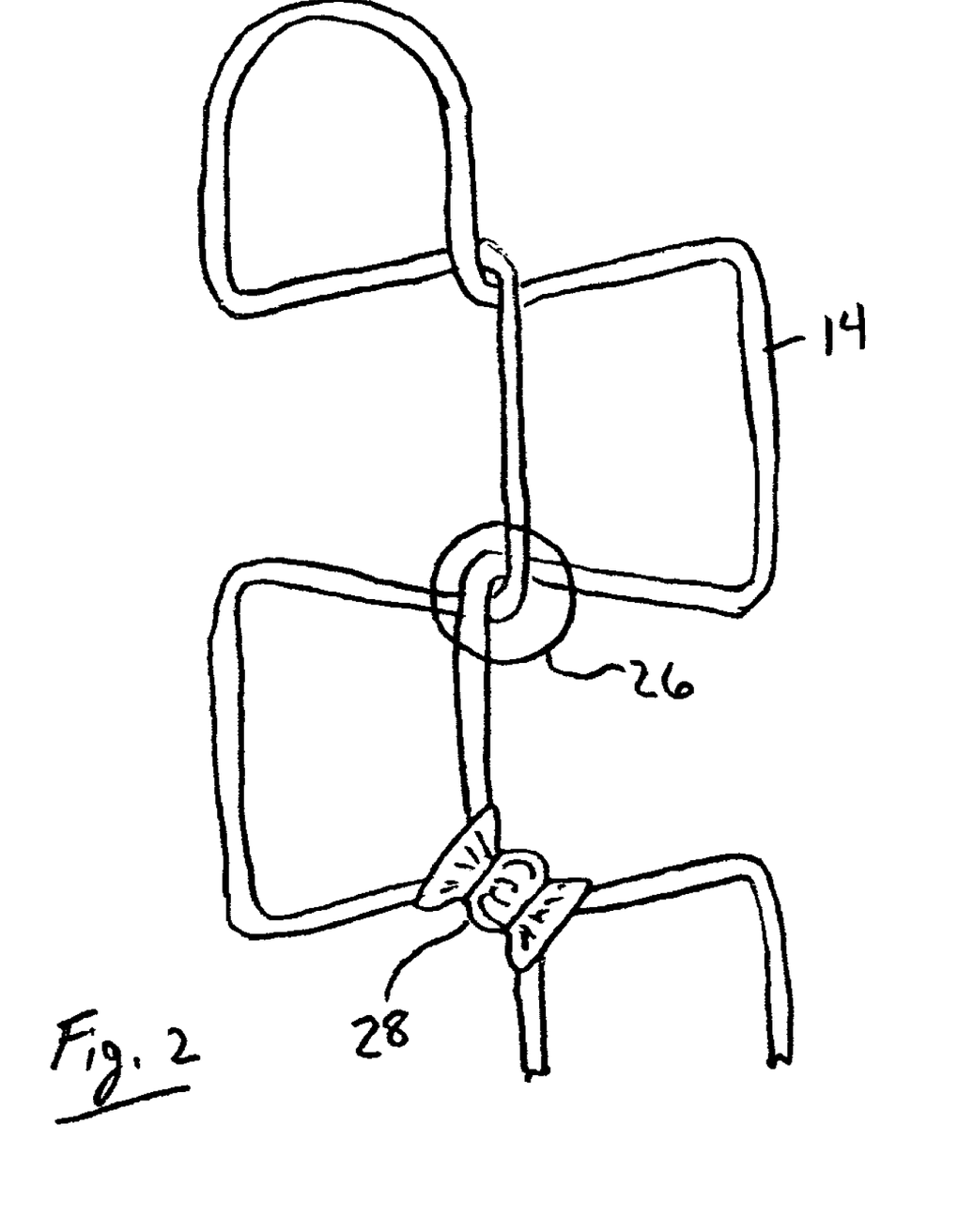
FIG. 2 is an enlarged front view of a portion of the optic fiber net portion of the present invention.

In FIGS. 1 and 2, the fiber optic net 12 is illustrated schematically to emphasize the continuous nature of the weave of the optic fiber wire 14. The fiber optic net 12 is suspended between two or more uprights U, which illustrates one possible manner in which the optic fiber net 12 may be secured around a protected perimeter.

In the preferred embodiment, as illustrated in FIGS. 1 and 2, for example, the junctures 26 where the fiber optic wire 14 crosses itself are provided with a fastener 28. The fastener 28 is also referred to as a "button." The buttons 28 are provided, preferably at each juncture 26. While the exact structure and configuration of the buttons 28 are not the subject of the instant application, one function of the buttons 28 is to help cause a break of the optic fiber wire 14 if an intruder attempts to break or remove one of the buttons 28. The buttons 28 may be ultrasonically welded to the optic fiber wire 14 at the junctions 26. Naturally, while ultrasonic welding is one possible way to attach the buttons at the junctures 26, ultrasonic welding is not required to practice the invention and adhesives, and other fasteners are contemplated to fall within the scope of the invention.

When the fiber optic net 12 is woven, its structure is such that the fiber optic net 12 retains its configuration, much like a sweater keeps its shape despite being woven from a continuous strand of yarn. Accordingly, the buttons 28 are not required to maintain the fiber optic net 12 in its net-like configuration. However, the buttons 28 are a preferred additional security feature because, as discussed, if an intruder tampers with a button 28, the result will be a breakage of the fiber optic wire 14, which will trigger an intruder alarm.

It should be noted that, in the preferred embodiment of the invention, a button 28 will be placed at each juncture 26. This assures that if any button 28 is tampered with, the optic fiber wire 14 will break and an alarm will sound. The addition of buttons 28, however, translates into an increased weight of the fiber optic net 12. Increasing the number of buttons 28 also adds to the manufacturing cost of the optic fiber net 12. Accordingly, it is contemplated that a button 28 will not be provided at each an every juncture 26. In fact, it is contemplated that the buttons 28 may be arranged advantageously in a specific pattern to maximize effectiveness while minimizing both weight and cost. Alternatively, the buttons 28 may be arranged randomly, if desired.

While not needed to maintain the optic fiber wire 14 in a net-like configuration for the fiber optic net 12, the buttons 28 are believed to assist in maintaining the fiber optic net 12 in its preferred orientation. Therefore, while it is recognized that the buttons 28 are not needed to practice the invention, the inclusion of at least some buttons 28 is preferred.

The buttons 28 may be any suitable type as would be appreciated by those skilled in the art. For example, the buttons 28 may be made from any suitable material including plastic, metal, a composite material, etc. Alternatively, instead of using buttons 28, a thermoplastic material may be deposited at the junctures 26 in a molten state that hardens upon cooling. To this end, the optic fiber wire 14 may be coated with a thermoplastic resin during the weaving process so that the coating of the optic fiber wire 14 fastens the optic fiber wire 14 to itself at the junctures 26. Alternatively still, the junctures 26 could be provided with a suitable adhesive in the place of the buttons 28. The wide variety of fasteners 28 that may be employed are too numerous to list, as would be appreciated by those skilled in the art, and the scope of the present invention is not intended to be limited to the specific embodiments (i.e., the buttons 28) discussed above.

It is also noted that the specific weave pattern of the optic fiber net 12, which is illustrated in FIGS. 1 and 2, is merely a preferred pattern of weaving the optic fiber wire 14 into the optic fiber net 12. Other patterns also may be employed and are too numerous to list herein. The other weave patterns, which would be appreciated by those skilled in the art, are also contemplated to fall within the scope of the invention.

Figure 3:
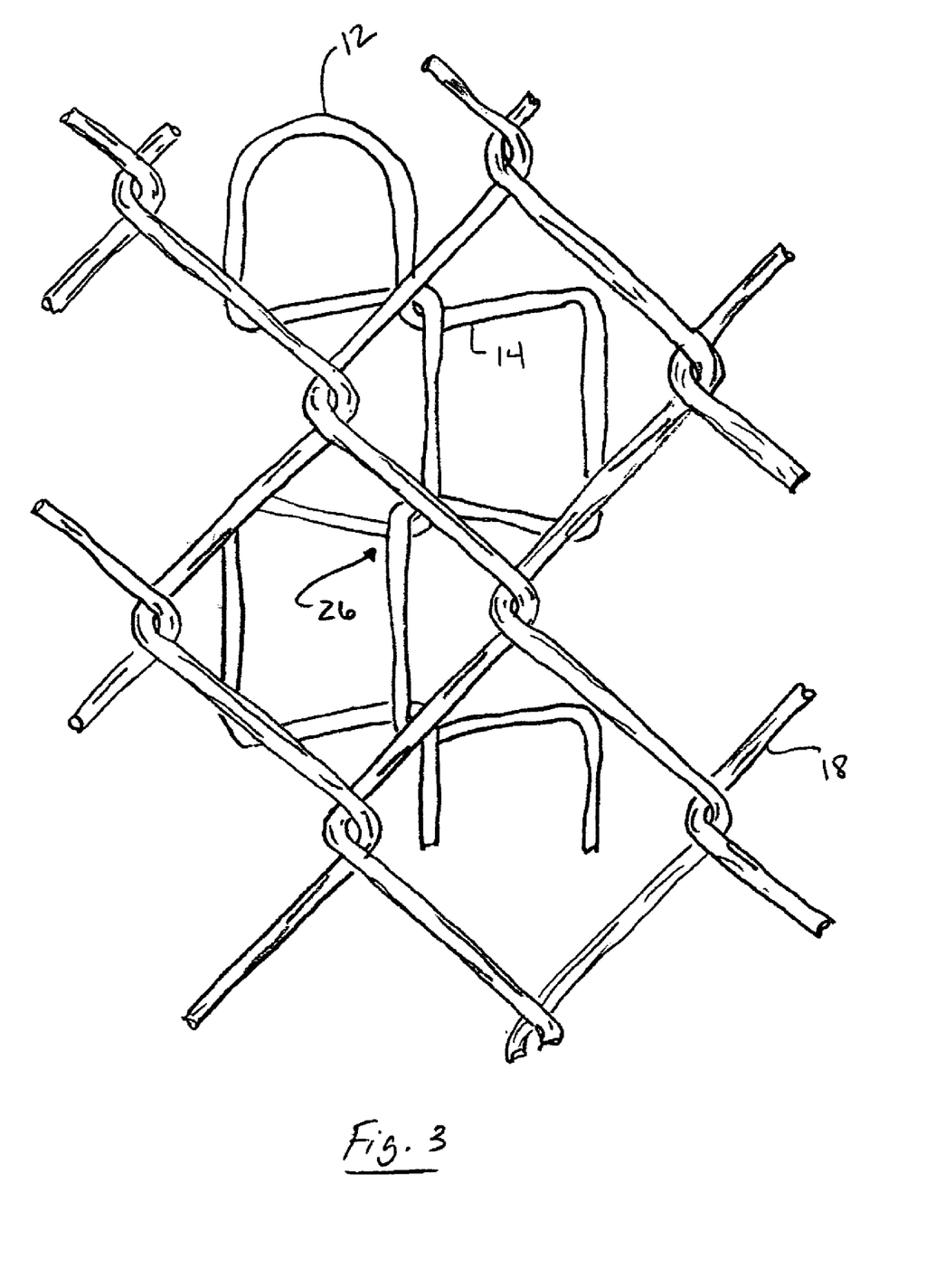
FIG. 3 is a partial front plan view of one possible positioning of the optic fiber net portion adjacent to a chain link fence according to one embodiment of the present invention.
Figure 4:
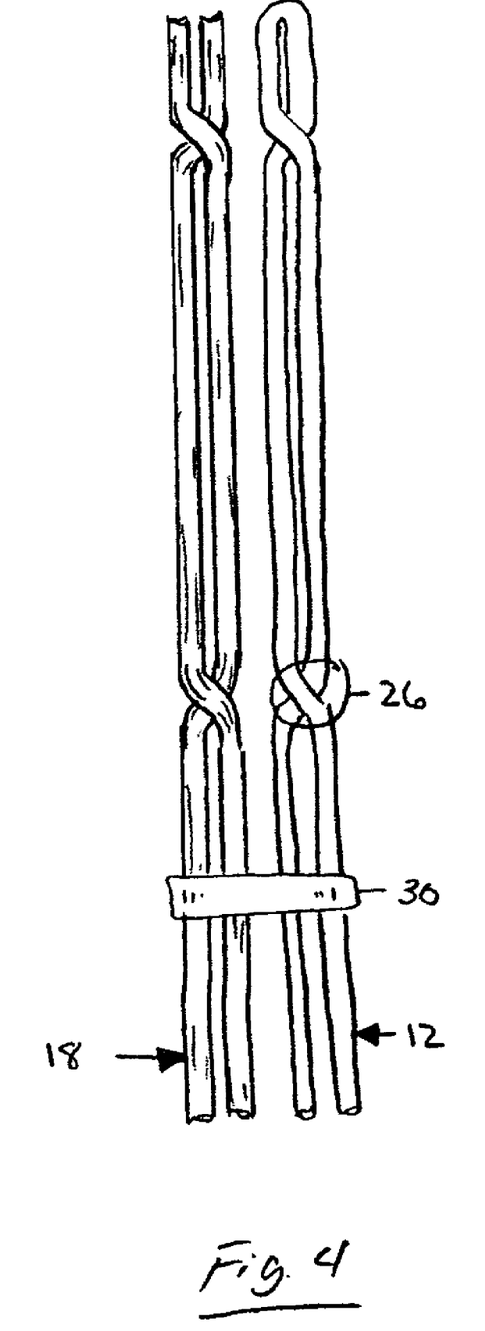
FIG. 4 is a partial side view of the positioning of the optic fiber net and the chain link fence illustrated in FIG. 3.

As should be appreciated from the discussion that follows and by those skilled in the art, the optic fiber net 12 may be erected in any number of configurations. In the preferred embodiment, the optic fiber net 12 is disposed adjacent a chain link fence 18 and is connected thereto via one or more fasteners (or clips) 30. The height of the optic fiber net 12 need not be the same height as that of the chain link fence 18. It is contemplated, for example, that the fiber optic net 12 may extend a distance above the top of the chain link fence 18 in certain installations.

Alternatively, although not preferred, the fiber optic net 12 may be manufactured with the chain link fence 18 such that the fiber optic net 12 is interwoven into the chain link fence 18. It is also contemplated that the chain link fence 18 may be manufactured from a hollow wire such that the optic fiber wire 14 may be threaded therein. If so constructed, the chain link fence 18 would present an outward appearance of a standard chain link fence 18 but would, in fact, incorporate features and aspects of the present invention.

As illustrated in FIG. 1, the optic fiber wire 14 is connected at one end to a light generator 20. The light generator 20 may be a laser or a Class 1 laser diode with an output wavelength of either 850 nm or 1300 nm, among others. The light also may include wavelengths of visible light or of any other portion (or portions) of the electromagnetic spectrum. In one embodiment, the light falls within the infrared portion of the electromagnetic spectrum. The other end of the optic fiber wire 14 is connected to a light receiver 22. The light receiver 22 may be any type of receiver including a PIN Diode, for example.

In the preferred embodiment of the security system 10 of the present invention, the light generators 20 and light receivers 22 are positioned adjacent to the optic fiber net 12. Since this means that the light generators 20 and light receivers 22 will be exposed to the environment, each unit is preferably constructed to withstand wind, rain, snow, heat, and cold, among other environmental conditions. The light generators 20 and light receivers 22 are, in turn connected to a monitoring station 44, which is usually positioned at a location remotely from the individual light generators 20 and receivers 22. The connection to the monitoring station 44 may be via a wired connection or a wireless connection, as would be appreciated by those skilled in the art. If the connection is wireless, in one embodiment, the transmission of signals may be via any suitable transmission wavelength of electromagnetic radiation including, but not limited to radio waves, microwaves, and infrared light. While not enumerated, other transmission method and means also may be employed without departing from the scope of the present invention.

In one embodiment of the security system 10 of the present invention, the signals processed may be light signals.

In another embodiment, the light signals may be converted to electrical signals for processing. For example, being a computing device, the monitoring station 44 is contemplated to operate via electrical signals. When the monitoring station 44 communicates to one or more of the light generators 20 and light receivers 22 via a wired connection, it is contemplated that the wired connection will be optical. Accordingly, the electrical signals processed by the monitoring station 44 must be converted to light signals for transmission to the locations of the light generators 20 and light receivers 22. To accomplish this, it is contemplated that the electrical signals will be converted to light signals via a RS-232 (or EIT-232) connection. When the optical signal is received by one or more of the control boxes located at various positions throughout the security system, the light signals are converted back to electrical signals via a RS-232 (or EIT-232) connection. In other words, conversion between light and electrical signals may occur at one or more locations within the security system 10 of the present invention, as would be appreciated by those skilled in the art.

It is also contemplated that the microprocessor with be provided with a RS-232 (or EIT-232) port so that the microprocessor may be programmed via an external microprocessor, such as a laptop computer, personal data assistant, etc. The same port also provides access to the microprocessor for diagnostic purposes and maintenance purposes, as would be appreciated by those skilled in the art.

The monitoring station 44 preferably includes a microcomputer (not shown) that sends and receives the various signals from the light generators 20 and the light receivers 22. The microcomputer may include a graphical user interface (GUI), for example, that permits monitoring of the operation of the security system 10. The microcomputer may permit calibration of the security system 10 and permit input to adjust the sensitivity of the system 10, among other features.

It is noted that the term "microcomputer" is intended to be given a broad interpretation. To avoid any misunderstandings, any of the following may be the type of microcomputer employed: (1) a personal computer, (2) a laptop computer, (3) a mainframe computer, (4) a personal data assistant (or "PDA"), etc. The microcomputer may have a program loaded with a memory (such as a Random Access Memory ("RAM")) to trigger an alarm. Alternatively, the program may be hardwired into the microcomputer in some other contemplated variations.

In yet another contemplated embodiment, it is conceivable that the monitoring station 44 may be at a location that is quite remote from the security system 10 that it monitors. For example, the monitoring station 44 may be located in one state (or local principality) while the security system 10 is located in another state (or local principality). In this embodiment, the monitoring system 44 may be connected to the security system via the Internet.

In still another embodiment, it is contemplated that a monitoring station 44 may be connected to and may monitor the operating parameter of several security systems 10 simultaneously. For example, several security systems 10 could be installed in disparate subunits of a business. All of the security systems 10, however, may feed detection information to a single monitoring station 44. When the monitoring station 44 detects a security breach or an attempted security breach, an alarm can be triggered so that security personnel may be dispatched to the appropriate location. One advantage of a centralized monitoring station 44 is a reduction in the cost of monitoring several security systems 10 simultaneously.

The security system 10 operates to generate an alarm upon the occurrence of several different events. First, the security system 10 is designed to detect a break in the optic fiber net 12, as discussed below. Second, the security system 10 is designed to detect an attempted breach of the secure perimeter even if the optic fiber net 12 is not broken. This may include an attempt to climb over the physical security barrier, for example, also as discussed in greater detail below.

Light emitted by the light generator 20 is conducted through the optic fiber wire 14 and is received by the light receiver 22. When the security system 10 operates, the light generator 20 is activated so that a light signal is inputted into the optic fiber wire 14. Should a person cut through the optic fiber net 12, the light signal emitted by the light generator 20 will be interrupted. The light receiver 22 will detect the absence of a light signal and will output an alarm signal that triggers, among other types of alarm indications, an audible alarm.

The security system 10 also includes at least one optical sensor wire 24 that is connected to or interwoven with the optic fiber net 12 and/or the chain link fence 18, at least in the preferred embodiment. Alternatively, the optical sensor wire 24 may be affixed to the optic fiber net 12 and need not be interwoven therewith. For the security system 10, it is contemplated that the optical sensor wire(s) 24 will be connected to the optical fiber net 12 in one fashion or another. The reason for this is that, upon application of a force to the optical fiber net 12, such as would occur if a person attempted to climb over the optical fiber net 12, the force will be transferred to the optical sensor wires 24. Alternatively, where the security system 10 is applied to a chain link fence 18, the optical sensor wires 24 may be attached to the chain link fence 18 and not be connected to the optical fiber net 12. With this construction, if an intruder attempts to climb over the fence 18, the intruder's activity will have a detectible effect on the optical sensor wires 24, as in the previous example.

As shown in FIG. 1, in one embodiment, one optical sensor wire 24 is disposed about ⅓ of the distance from the top of the fiber optic net 12 and another is disposed about ⅓ of the distance from the bottom of the fiber optic net 12. The arrangement is contemplated for a tall physical barrier, for example, a chain link fence 18 that is twelve feet tall (3.66 m). For a shorter chain link fence 18, only one optical sensor wire 24 may need to be employed. The optical sensor wire 24 for a shorter chain link fence 18, for example an eight foot fence (2.44 m), may be woven into the fiber optic net 12 and chain link fence 18 at an intermediate position between the top and bottom.

In still other contemplated embodiments, the optic fiber net 12 may extend a distance of four feet (1.22 m) or more above the height of the chain link fence 18. For example, the chain link fence 18 may be eight feet tall (2.44 m) and the optic fiber net 12 may be twelve feet tall (3.66 m). If so, the optic sensor wires 24 preferably are positioned ⅓ of the distance (i.e., 4 ft. or 1.22 m) below the top of the optic fiber net 12 and ⅓ of the distance (i.e., 4 ft. or 1.22 m) above the bottom of the optic fiber net 12. In yet another contemplated embodiment, one optic sen fiber net 12 and another at the bottom of the optic fiber net 12. In still another embodiment, a single optical sensor wire 24 may extend near the bottom of the optic fiber net 12, extend vertically along one of the uprights U, for example, and then transition to a horizontal path adjacent to the top of the optic fiber net 12. The optical sensor wire also may be attached to the optic fiber net 12 in a serpentine pattern. The exact arrangement of the optical sensor wire 24 is expected to vary depending upon the particular needs of the security installation and the sensitivity required for the particular installation.

In one contemplated embodiment of the security system 10, the optical sensor wire 24 extends along the bottom of the optic fiber net 12, transitions vertically along one of the uprights U, and extends along the top of the optic fiber net 12. In this configuration, the optic fiber net 12 is stretched between the portion of the optical sensor wire 24 at the bottom of the optic fiber net 12 and the portion of the optical sensor wire 24 at the top of the optic fiber net 12. While a single optical sensor wire 24 may extend along both the bottom and top of the optic fiber net 12, other configurations are also contemplated to fall within the scope of the invention. For example, one optical sensor wire 24 may extend along the bottom of the optic fiber net 12. A second, independent optical sensor wire 24 may extend along the top of the optic fiber net. Naturally, as would be appreciated by those skilled in the art, still further variations may be employed. These variations are also intended to be encompassed by the invention.

In one embodiment, the optical sensor wire 24 is interwoven into the fiber optic net 12 and the chain link fence 18 to detect an attempted intrusion over or through the optic fiber net 12. The optical sensor wire 24 is also designed to operate so that it may detect an attempt to cut through the chain link fence 18 to which the optic fiber net 12 is attached, as will be discussed in greater detail below.

The optical sensor wire 24 preferably is encased in a rigid (or at least semi-rigid) conduit (not shown). The conduit, in one contemplated embodiment, is made of a plastic material, but other materials also may be used. For example, the conduit could be made of a metal such as aluminum, steel, copper, or the like. Also, the conduit could be made from a composite material such as one incorporating carbon fibers.

The optical sensor wire 24 (or plurality of optical sensor wires 24) are connected between the light generator 20 and the light receiver 22, as indicated by the dotted lines in FIG. 1. Alternatively, the optical sensor wire 24 may be connected between a light generator 20 and receiver 22 separate from those illustrated in FIG. 1. Regardless of the particular arrangement employed, the light generator 20 inputs a light signal at one end of the optical sensor wire 24. The light receiver processes the signal exigent from the optical sensor wire 24 at the other end.

In the preferred embodiment, the light signal that passes through the optical sensor wire 24 is encoded with a specific pattern (or patterns) that are altered when the optical sensor wire 24 is disturbed during operation of the security system 10. The light patterns that pass through the optical sensor wire are referred to as "speckle patterns." The exact details of the speckle patterns are not critical to the operation of the present invention. In fact, each security installation may rely on a different speckle pattern so that intruders familiar with the general construction and operation of the security system 10 of the present invention may not learn the details of one speckle pattern and employ that knowledge to breach others of the same security systems 10 at different locations. In addition, it is contemplated that the speckle pattern for a particular installation may be altered periodically so that the same speckle pattern is not employed all of the time. For example, it is expected that the speckle pattern may be rotated through a series of different patterns on a regular basis, such as hourly, daily, weekly, or whatever period is desired. This is expected to decrease the possibility that an intruder may be able to reverse engineer the speckle pattern and introduce a false speckle pattern designed to "trick" the security system 10 and, thereby, gain access to the secure perimeter.

In the preferred embodiment of the security system 10 of the present invention, any vibration (or disturbances, however brief) of the optical sensor wire 24 disturbs the speckle pattern carried thereby. This alters the speckle pattern, which alteration is detected by the light receiver 22 (or microprocessor). If the pattern deviates more than a predetermined amount from the initial signal, an alarm is triggered.

It is contemplated that the sensitivity of the security system 10 will be selected for each installation depending on the required level of security. Preferably, the sensitivity of the security system 10 will be such that the speckle pattern through the optical sensor wire 24 will trigger an alarm only upon the detection of a disturbance of a predetermined magnitude. The sensitivity of the security system 10 may be adjustable via interaction through the GUI (or other input/output device) associated with the microcomputer or computer, as the case may be.

The security system 10 is also designed to detect an attempt to cut through the chain link fence 18 while leaving the optic fiber net 12 in tact. When an intruder cuts through a chain link fence 18, the cutting tool will create a momentary vibration (called a "ping") as the cutting tool severs one of the links in the fence 18. The "ping" is a vibrational disturbance that travels through the chain link fence 18 to the optical sensor wire 24. The nature of the ping is such that it will momentarily disturb the speckle pattern traveling through the optical sensor wire 24, which will cause the light receiver 22 to initiate an alarm.

Another type of intrusion that the security system 10 detects is a break in the optic fiber net 12, as discussed above. If the optic fiber net 12 is broken, the light signal traveling through the optic fiber wire 14 is terminated, causing the light receiver 22 to initiate an alarm.

As may be appreciated from the foregoing discussion, the sensitivity of the optical sensor wire(s) 24 is such that they may also detect other types of intrusions and attempted intrusions including, but not limited to, an attempt to lift, crawl under or pass through the optical fiber net 12 and/or the chain link fence 18 (in one embodiment).

While these types of intrusion are discussed in connection with the deployment of the security system 10 with a chain link fence 18, the same types of disturbances are detectable for other types of physical security barriers, including walls, etc., as listed above.

Since the optical sensor wire 24 permits the detection of intrusions and attempted intrusions, the physical spacing between the optical sensor wires 24 affects the sensitivity of the security system 10. The closer the optical sensor wire 24 is to an attempted intrusion, the greater is the ability of the optical sensor wire 24 to detect the intrusion. Accordingly, it is contemplated that the security system 10 of the present invention may incorporate more than two optical sensor wires 24 interwoven into the fiber optic net 12 and/or the chain link fence 18, as may be required by the particular demands for the specific installation. More than two optical sensor wires 24 also may be required in a marine installation, for example, where the height of the optic fiber net 12 is likely to exceed twelve feet (3.66 m).

It is also contemplated in one embodiment that the optical sensor wire 24 may be employed only with the fiber optic net 12. In other words, the optical sensor wire 24 may be used even if the fiber optic net 12 is not attached to a chain link fence 18 or other physical security barrier. The operation of the optical sensor wire 24 is the same regardless of whether or not a physical security barrier, such as a chain link fence 18, is associated with the security system 10.

Figure 5:
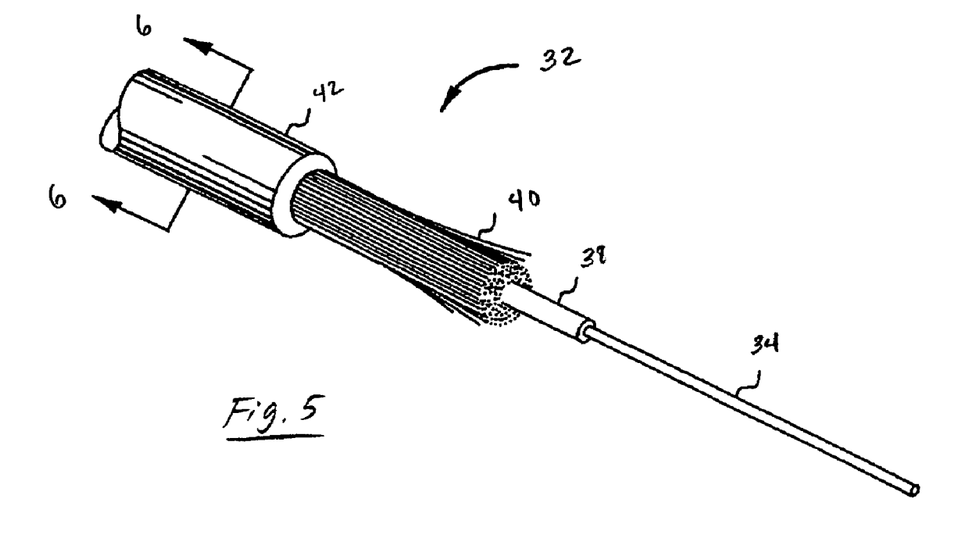
FIG. 5 is a partial perspective view of one embodiment of the optical sensor wire portion of the system of the present invention.
Figure 6:
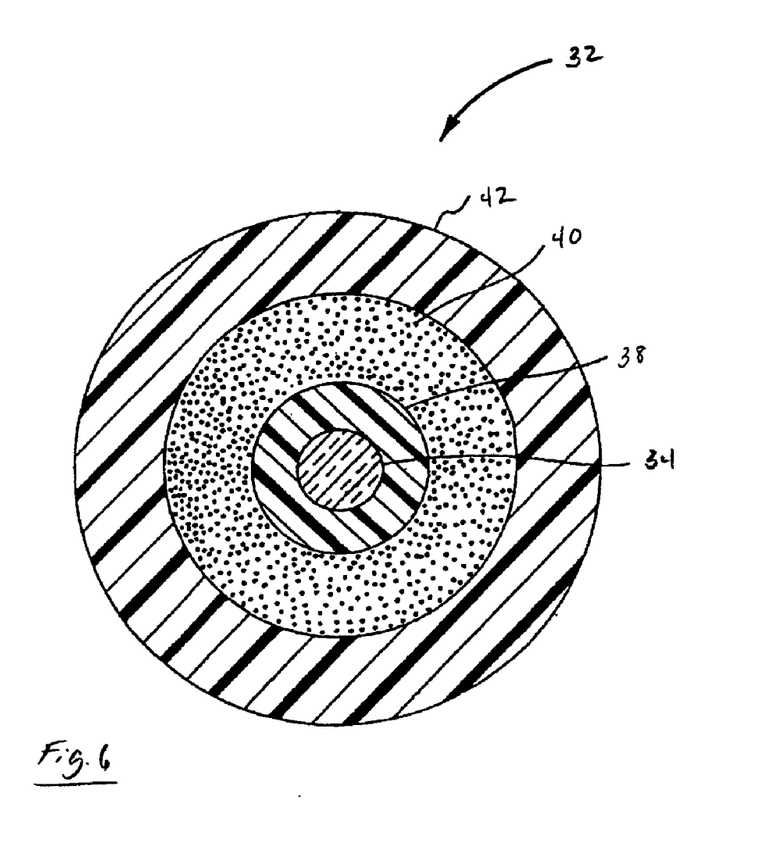
FIG. 6 is a cross-sectional view of the optical sensor wire illustrated in FIG. 5.
Figure 7:
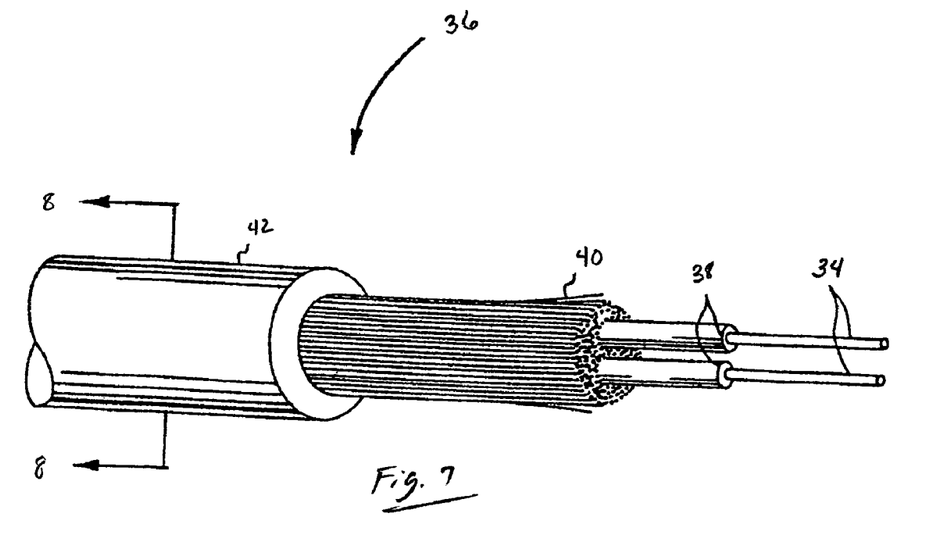
FIG. 7 is a partial perspective view of a second embodiment of the optical sensor wire portion of the system of the present invention.
Figure 8:
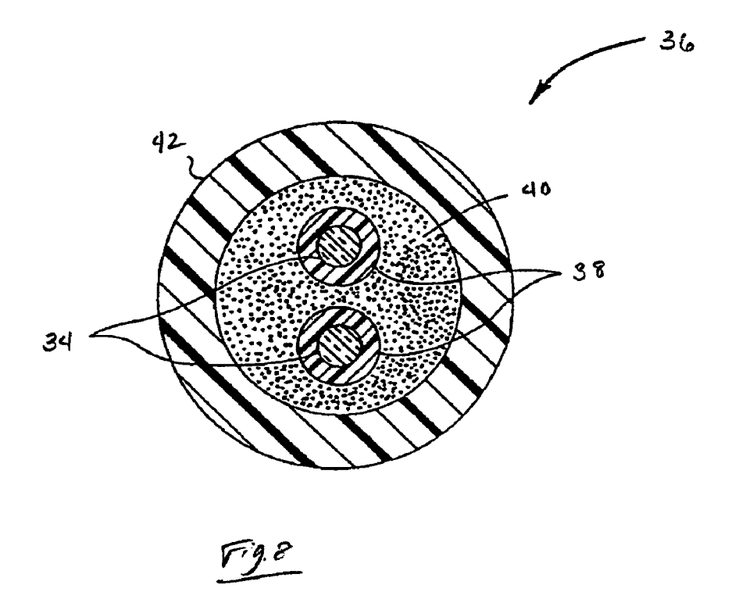
FIG. 8 is a cross-sectional view of the optical sensor wire illustrated in FIG. 7.
Figure 9:
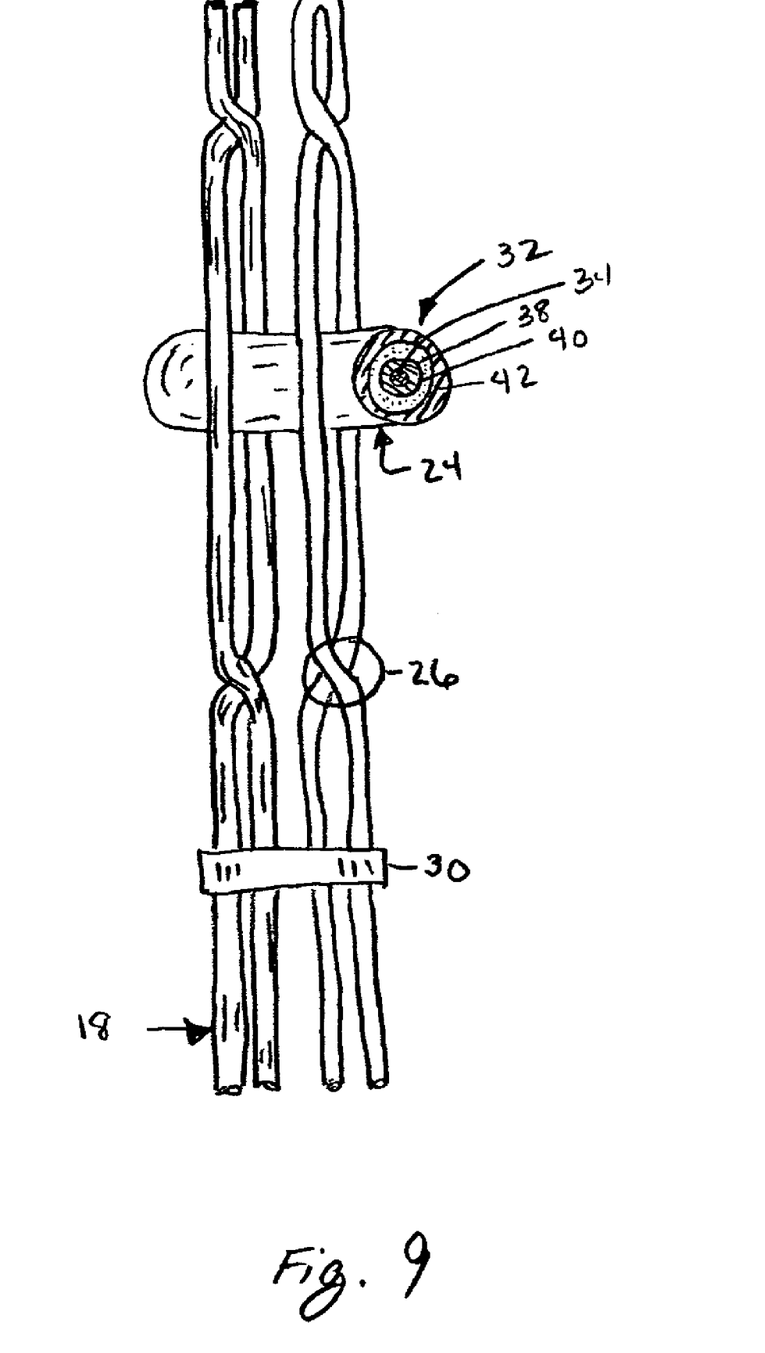
FIG. 9 is a side view of a portion of the optic fiber net, chain link fence, and optical sensor wire, illustrating one potential arrangement thereof.

The optical sensor 24 wire may have one of two preferred embodiments. In the first embodiment, the optical sensor wire 24 is a single optic fiber cable 32 with a single optic fiber 34 disposed therein. In the second embodiment, the optical sensor wire 24 is a double optic fiber cable 36 with two optic fibers 34 disposed therein. The first embodiment of the optical sensor wire 24 is illustrated in FIGS. 5 and 6. The second embodiment is illustrated in FIGS. 7 and 8. As would be appreciated by those skilled in the art, more than two optic fibers 34 may be disposed in the optical sensor wire 24, if desired. Accordingly, the security system 10 of the present invention is not limited solely to these two embodiments.

As illustrated in FIGS. 5 and 6, the fiber optic cable 32 has a multi-mode optic fiber 34 at its core. The optic fiber 34 is a 62.5/125 multi-mode fiber with a silica/germania core with a diameter of 62.5±3 µm. Alternatively, the optic fiber 34 may be a 50/125 multi-mode fiber with a silica/germania core with a diameter of approximately 50 µm. The core is silicon cladded to a diameter of 125±2 µm. A tight buffer 38 is provided around the optic fiber 34 to a diameter of 900±100 µm. The tight buffer 38 may be Teraflex PVC 126, or equivalent. An aramid yarn 40 is stranded around the tight buffer 38. The aramid yarn 40 may be Kevlar® or Twaron®. Eight yarns of 1580 dtx are used. A green polyurethane jacket 42 is extruded over the aramid yarn 40 with a minimum thickness of 1 mm. The green polyurethane jacket 42 may be Goodrich 58202, Goodrich 58304, or a Wilson green masterbatch with UV protection 140GN20. The final diameter of the optic fiber cable 32 is 4.0±0.01 mm. The optic fiber cable 32 has a minimum bending radius of 2.5 mm, which permits knotting of the cable 32 without breakage of the optic fiber 34.

As illustrated in FIGS. 7 and 8, the fiber optic cable 36 has two multi-mode optic fibers 34 at its core. The optic fibers 34 are 62.5/125 multi-mode fibers with a silica/germania core with a diameter of 62.5±3 µm. Alternatively, the optic fiber 34 may be a 50/125 multi-mode fiber with a silica/germania core with a diameter of approximately 50 µm. The core of each fiber 34 is silicon cladded to a diameter of 125±2 µm. A tight buffer 38 is provided around each optic fiber 34 to a diameter of 900±100 µm. The tight buffer 38 may be Teraflex PVC 126, or equivalent. An aramid yarn 40 is stranded around the tight buffer 38. The aramid yarn 40 may be Kevlar® or Twaron®. Eight or more yarns of 1580 dtx are used. A green polyurethane jacket 42 is extruded over the aramid yarn 40 with a minimum thickness of 1 mm. The green polyurethane jacket 42 may be Goodrich 58202, Goodrich 58304, or a Wilson green masterbatch with UV protection 140GN20.

It is also contemplated that the security system 10 of the present invention may rely on optic fibers with a larger or smaller diameter. For example, the security system 10 may incorporate optic fibers 34 with a 50 µm diameter, as would be appreciated by those skilled in the art.

Additionally, it is contemplated that the fiber optic cables 32, 36 may incorporate "swellable" aramid yarn fibers therein. Kevlar® fibers are one such example, although many alternatives may be employed without departing from the scope of the invention. Incorporating swellable fibers into the fiber optic cables 32, 36 offers further advantages. Swellable fibers absorb water and swell as a result of the absorption of water. If swellable fibers are incorporated in the fiber optic cables 32, 36, and if the polyurethane jacket 42 becomes damaged, the fibers will absorb water that enters the fiber optic cable 32, 36 and prevent the water from migrating within the fiber optic cable 32, 36. Moreover, swellable optic fibers also help to prevent water from reaching the optic fibers 34 because the fibers prevent (or at least inhibit) the radial migration of water within the fiber optic cable 32, 36.

In one contemplated embodiment of the invention, it is contemplated that the fiber optic cables 32, 36 will have different outside diameters depending upon the particular environment in which the fiber optic cables 32, 36 are employed. For example, in a ground-based environment, it is preferred that the fiber optic cables 32, 36 have an outside diameter of about 4.0 mm. In a marine environment, which is expected to a more unfriendly environment, it is preferred that the outside diameter of the fiber optic cables 32, 36 be about 4.4 mm. The larger diameter provides a more robust construction that is expected to withstand the more turbulent environmental conditions under water. Moreover, it is preferred that the two different cables be visually coded so that they may be distinguishable easily from one another. For example, the ground-based fiber optic cable 32, 36 may be tinted or colored green while the marine-based fiber optic cable 32, 36 may be tinted or colored blue. These colors also may assist in camouflaging the optical fiber nets 12 in the environments where they are positioned.

One advantage that the security system 10 offers over the prior art lies in the fact that the system relies on at least two sensor schemes to detect an intrusion or attempted intrusion into the secure perimeter. In particular, the addition of the optical sensor wire(s) 24 to the optical fiber net 12 permits the security system 10 to detect disturbances of the optical fiber net 12 separate and apart from actual breaks in the optical fiber net 12. Moreover, this construction offers other advantages over the prior art. In particular, a fewer number of light generators 20 and light receivers 22 are required as compared with the prior art. One reason for this is the addition of the optical sensor wire(s) 24 to the optical fiber net 12.

With respect to the design of prior art security fences, it has traditionally been known to rely solely on the optic fiber net 12 for detection of security breaches. This poses a difficulty because each 100 meters (about 300 ft.) of optic fiber net 12 incorporates about 3000 m (about 10,000 ft.) of optic fiber wire 14. Inevitably, there are transmissive losses of light as it travels through any optic fiber wire 14. To accommodate this, traditional security fence manufacturers position a light generators and light receivers at intervals of about every 300 feet (or about every 91.44 m) from one another along the length of the fence.

The cost of each microprocessor can be substantial. Therefore, in a security installation where the security fence is several miles long (1 mile=1609.34 m), the cost rapidly escalates. Another difficulty with the traditional system is that the signal microprocessor (the light receiver) merely detects a loss of the light signal.

Another prior art fence that is known also relies on the optic fiber net to provide information about a breach in the net. In this other example, one signal microprocessor is positioned regularly along the length of the fence. The signal microprocessor relies on OTDR (optical time domain reflectometry) technology to detect a breach in the security fence. A significant drawback to this design is that the signal microprocessor can be quite expensive.

The security system 10 of the present invention provides the ability to detect both an intrusion and an attempted intrusion. In addition, the cost of the system is considerably less than prior art systems. Furthermore, the false alarm rate of the security system 10 of the present invention is considerably less than systems in the prior art.

As will be appreciated by those skilled in the art, the security system 10 of the present invention is a considerable improvement over security systems known in the art because the detection features of the security system 10 have been segregated into two components. First, the security system 10 permits detection of a breach in the optic fiber net 12 because a break in the optic fiber wire 14 will result in a loss of the light signal to the light receiver 22 at the end of the panel 16 or series of panels 16. Second, an attempted intrusion through the optical fiber net 12 will be detected the optical sensor wire 24. If the fence 18 is disturbed to an extent that the speckle pattern passing through the optical sensor wire 24 is disrupted or altered to an extent that exceeds a predetermined threshold, the light receiver 22 will trigger an alarm.

One aspect of the security system 10 of the present invention, therefore, lies in the separation of detection of a breach (e.g., a breach in the optic fiber net 12) and detection of a disturbance of the fence 18 by the optical sensor wire 24. Since the optical sensor wire 24 extends in an essentially linear fashion along the fence 18 (at a particular height or particular heights of the fence 18), the light passing through the optical sensor wire 24 travels a lesser comparative distance than the light passing through the optic fiber net 12. Accordingly, the light receiver 22 may be positioned at a considerably greater distance from the light generator 20 than in security barriers known in the art. Simply, the fact that the optical sensor wire 24 does not extend through a convoluted path (as compared to the optical fiber wire 14) presents a combination that greatly simplifies the construction of the security system 10.

In operation, one light signal is inputted by the light generator into one end of the optic fiber wire 14 that forms the optic fiber net 12. A separate light signal, preferably coded with a speckle pattern, is generated by the light generator 12 and passes through the optical sensor wire 24. Of course, as would be appreciated by those skilled in the art, the same light signal may be introduced into both the optical fiber wire 14 and the optical sensor wire 24 without departing from the scope of the present invention.

So constructed, the security system of the present invention requires a pair of light generators 20 and light receivers 22 at regular intervals. Since the security system 10 of the present invention relies on variance of the speckle pattern carried by the optical sensor wire 24 to detect a breach or attempted breach, the microprocessor is considerably less complex than the OTDR example. As a result, the microprocessor costs a mere fraction of the cost of the OTDR-type system.

Another advantage inherent in the construction of he security system 10 of the present invention lies in the fact that the sensitivity of the system may be easily adjusted by altering the magnitude of the predetermined deviation of the speckle pattern transmitted through the optical sensor wire 24 that will trip an alarm. In other words, the sensitivity of the security system may be increased by decreasing the amount of deviation of the speckle pattern needed to trigger an alarm. Conversely, the sensitivity of the security system 10 can be decreased by increasing the amount of speckle pattern deviation needed to trigger an alarm.

Accordingly, in a preferred embodiment of the invention, the sensitivity of the optical sensor wire 24 to disturbances is adjustable by the system operator. Adjustability offers considerable advantages. For example, if a particular installation finds that there are ten false alarms per day (due to animals touching the fence 18, for example), the operators may change the alarm threshold to reduce the number of false alarms (which renders the number of times security personnel are required to investigate a breach or an attempted breach in security).

While it is not expected that the speckle pattern threshold (the threshold required to trigger an alarm) will be adjusted frequently, it is contemplated that the threshold may need to be adjusted at least seasonally. For example, in winter, the environment when the security system 10 is installed may offer a more windy set of circumstances, which might require a proportional decrease in the sensitivity of the microprocessor. Similarly, if it rains, the sensitivity of the security system 10 may need to be altered to accommodate for the disturbances created when raindrops strike the security system 10.

In each of the embodiments discussed, it is assumed that the light passing through the optical fiber wire 14 remains constant since, to detect a breach, merely requires the absence of the light signal at the light receiver. It is contemplated that the security system 10 may be designed so that the intensity of the light passing through the optical fiber wire 14 may be altered. In addition, it is contemplated that a speckle pattern may be introduced into the optical fiber wire 14 to permit detection of an attempted breach by detecting an deviation in the speckle pattern.

Since the speckle pattern may be introduced into the optical fiber wire 14, one embodiment of the invention contemplates that the microprocessor will control the light input. In another embodiment, this result may be accomplished manually. Here, it is contemplated that the light generators 20 will be provided with at least two pairs of output ports. One pair of output ports is for the optical sensor wire and the other pair is for the optical fiber wire 14. One of each of the pair of outputs generates a speckleless light pattern, while the other generates a speckled light pattern. One end of the optical sensor wire 24 plugs into one of the output ports (preferably the output providing light with the speckle pattern). One end of the optical fiber wire plugs into one of the other pair of output ports (preferably the output port without the speckle pattern). Providing these ports provides greater system flexibility, as would be appreciated by those skilled in the art.

While the security system 10 of the present invention has been described in connection with specific embodiments thereof, the present invention is not intended to be limited solely to the embodiments described. As will be appreciated by those skilled in the art, elements of the invention may be altered from the specifics discussed above without departing from the scope and spirit of the invention. Moreover, it is intended that all equivalents that will be appreciated by those skilled in the art also fall within the scope of the present invention as discussed above and as recited by the claims appended hereto.

What is claimed is:

1. A security system, comprising:
   an optical fiber net woven from at least one optical fiber wire;
   a light generator connected at a first end of the optical fiber net to introduce an incident light signal into the optical fiber wire;
   a light receiver connected at a second end of the optical fiber net to receive an exigent light signal from the optical fiber wire; and
   at least one optical sensor wire connected to the optical fiber net such that the at least one optical sensor wire is displaced when a force is applied to the optical fiber net, the at least one optical sensor wire being connected between the light generator and the light receiver, the at least one optical sensor wire receiving a patterned incident light signal that is altered upon application of the force applied to the optical fiber net, thereby producing a patterned exigent light signal, wherein the light receiver comprises two light sensors, one receiving the exigent light signal from the optical fiber wire, the other receiving the patterned exigent light signal from the optical sensor wire, and wherein the light receiver initiates an alarm either (1) if the exigent light signal from the optical fiber wire terminates, or (2) after comparing the patterned exigent light signal with the patterned incident light signal in the at least one optical sensor wire and establishing a deviation, if the deviation exceeds a predetermined threshold.

2. The security system of claim 1, wherein the light generator comprises two light sources, one producing an incident light signal for the optical fiber net, the other producing a patterned incident light signal for the optical sensor wire.

3. The security system of claim 1, further comprising:
a physical security barrier to which at least the optical fiber net is attached.

4. The security system of claim 3, wherein the physical security barrier comprises at least one selected from a group comprising: a chain link fence, a barbed wire fence, a weld mesh fence, a concrete wall palisade, a stone wall palisade, a hedge, or a brick wall palisade.

5. The security system of claim 1, further comprising:
a physical barrier in which a least the optical fiber net is embedded.

6. The security system of claim 5, wherein the physical security barrier comprises at least one selected from a group comprising: a chain link fence, a barbed wire fence, a weld mesh fence, a concrete wall palisade, a stone wall palisade, a hedge, or a brick wall palisade.

7. The security system of claim 1, wherein the light receiver comprises a computer.

8. The security system of claim 1, further comprising:
a computer; and
a communications link, permitting the computer to communicate at least with the light generator and the light receiver, wherein the computer processes signals generated by the light receiver before initiating an alarm.

9. The security system of claim 8, wherein the communications link comprises a wired connection.

10. The security system of claim 8, wherein the communications link comprises a wireless connection.

11. A security system, comprising:
a physical security barrier;
an optical fiber net woven from at least one optical fiber wire disposed adjacent to the physical security barrier;
a first light generator connected at a first end of the optical fiber net to introduce an incident light signal into the optical fiber wire;

a first light receiver connected at a second end of the optical fiber net to receive an exigent light signal from the optical fiber wire;

at least one optical sensor wire connected to the optical fiber net such that the at least one optical sensor wire is displaced when a force is applied to the optical fiber net;

a second light generator connected at a first end of the optical sensor wire to introduce a patterned incident light signal into the optical sensor wire;

a second light receiver connected at a second end of the optical sensor wire to receive a patterned exigent light signal from the optical sensor wire, wherein the patterned incident light signal is altered upon application of the force applied to the optical fiber net, thereby producing a patterned exigent light signal, wherein the light receiver initiates an alarm either (1) if the exigent light signal from the optical fiber wire terminates, or (2) after comparing the patterned exigent light signal with the patterned incident light signal in the at least one optical sensor wire and establishing a deviation, if the deviation exceeds a predetermined threshold.

12. The security system of claim 11, further comprising:
a physical security barrier to which at least the optical fiber net is attached.

13. The security system of claim 12, wherein the physical security barrier comprises at least one selected from a group comprising: a chain link fence, a barbed wire fence, a weld mesh fence, a concrete wall palisade, a stone wall palisade, or a brick wall palisade.

14. The security system of claim 11, further comprising:
a physical barrier in which a least the optical fiber net is embedded.

15. The security system of claim 14, wherein the physical security barrier comprises at least one selected from a group comprising: a chain link fence, a barbed wire fence, a weld mesh fence, a concrete wall palisade, a stone wall palisade, or a brick wall palisade.

16. The security system of claim 11, wherein the light receiver comprises a computer.

17. The security system of claim 11, further comprising:
a computer; and
a communications link, permitting the computer to communicate at least with the light generator and the light receiver, wherein the computer processes signals generated by the light receiver before initiating an alarm.

18. The security system of claim 17, wherein the communications link comprises a wired connection.

19. The security system of claim 17, wherein the communications link comprises a wireless connection.

* * * * *